United States Patent Office 3,378,194
Patented Apr. 16, 1968

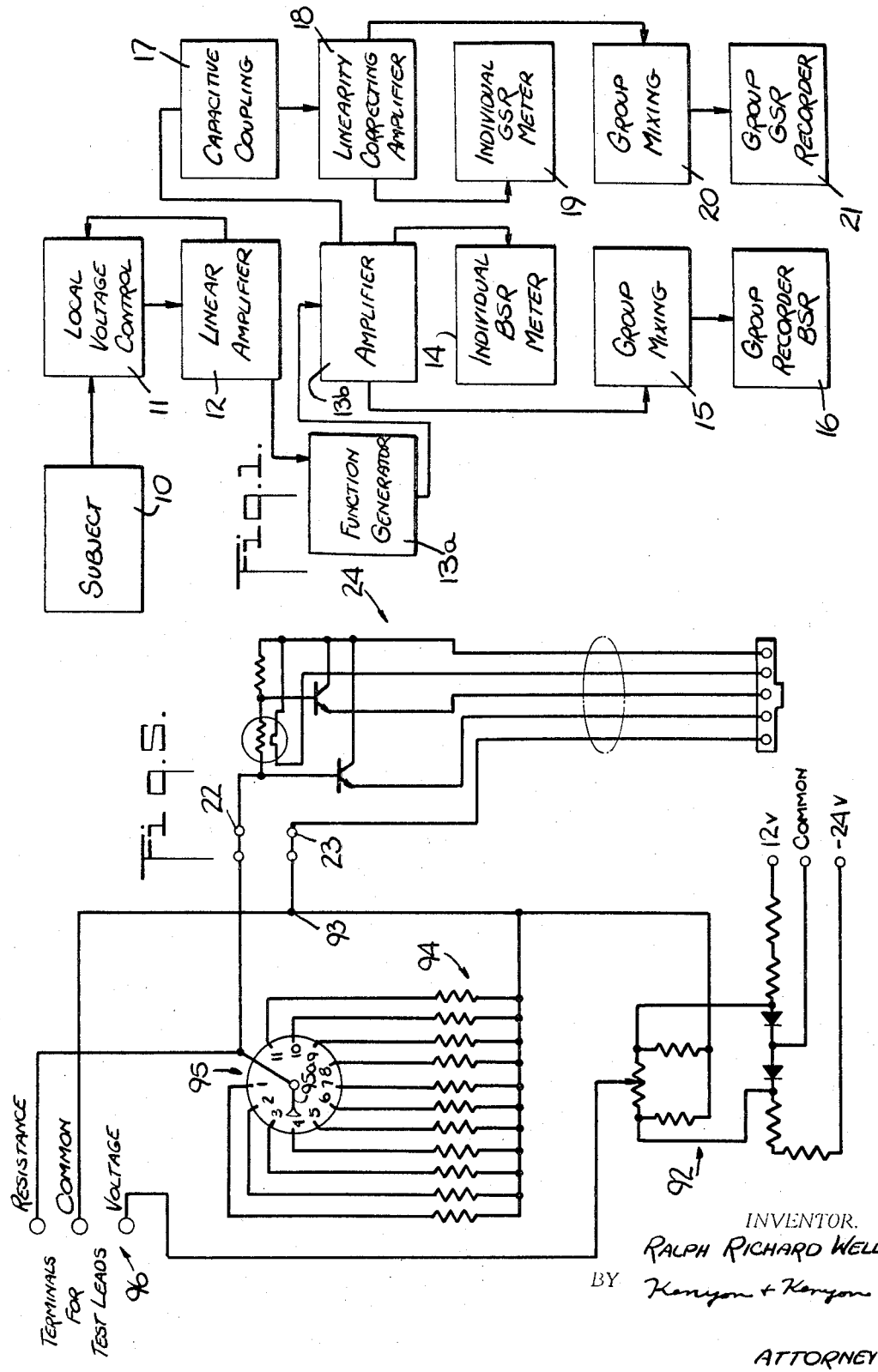

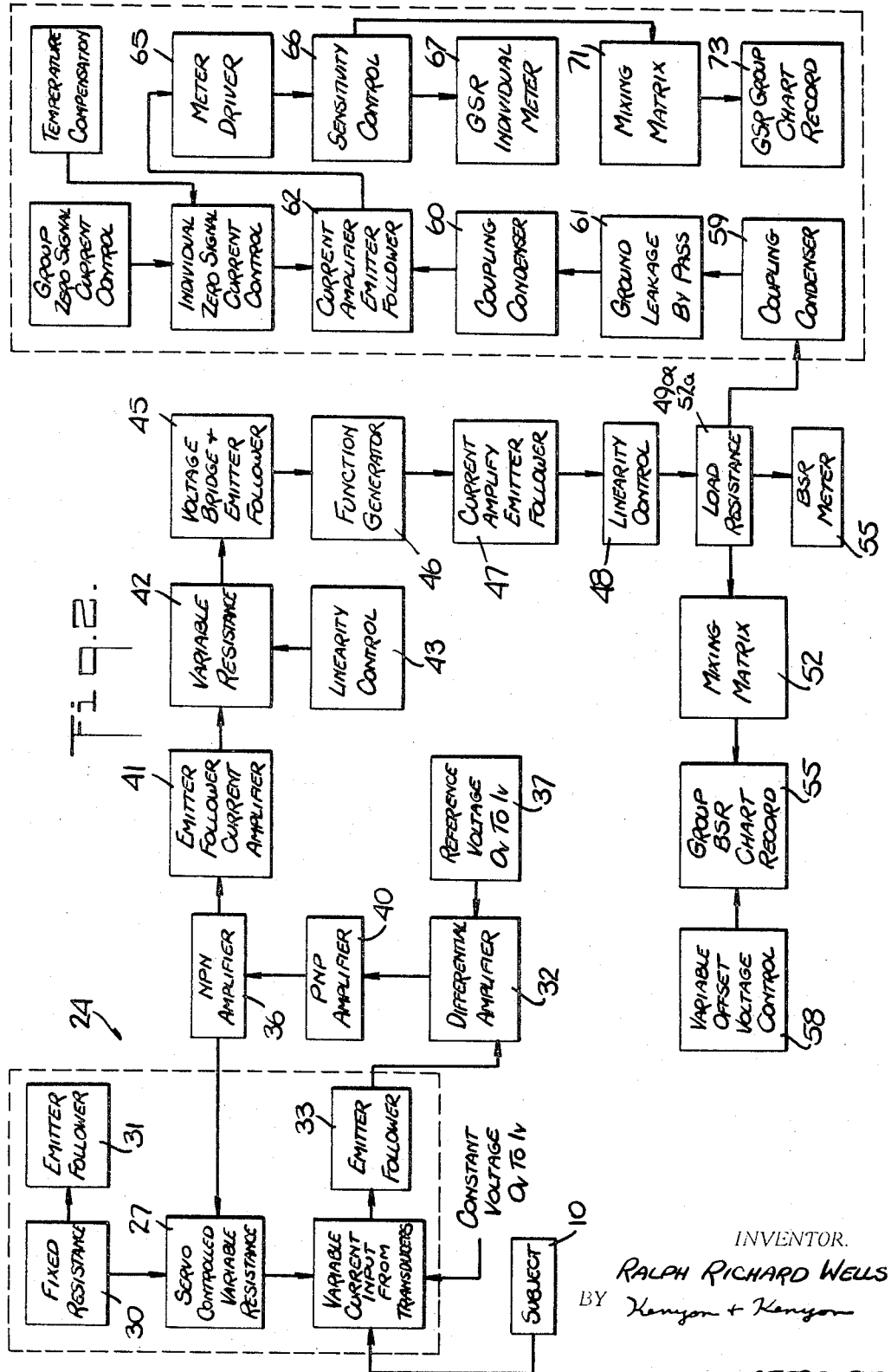

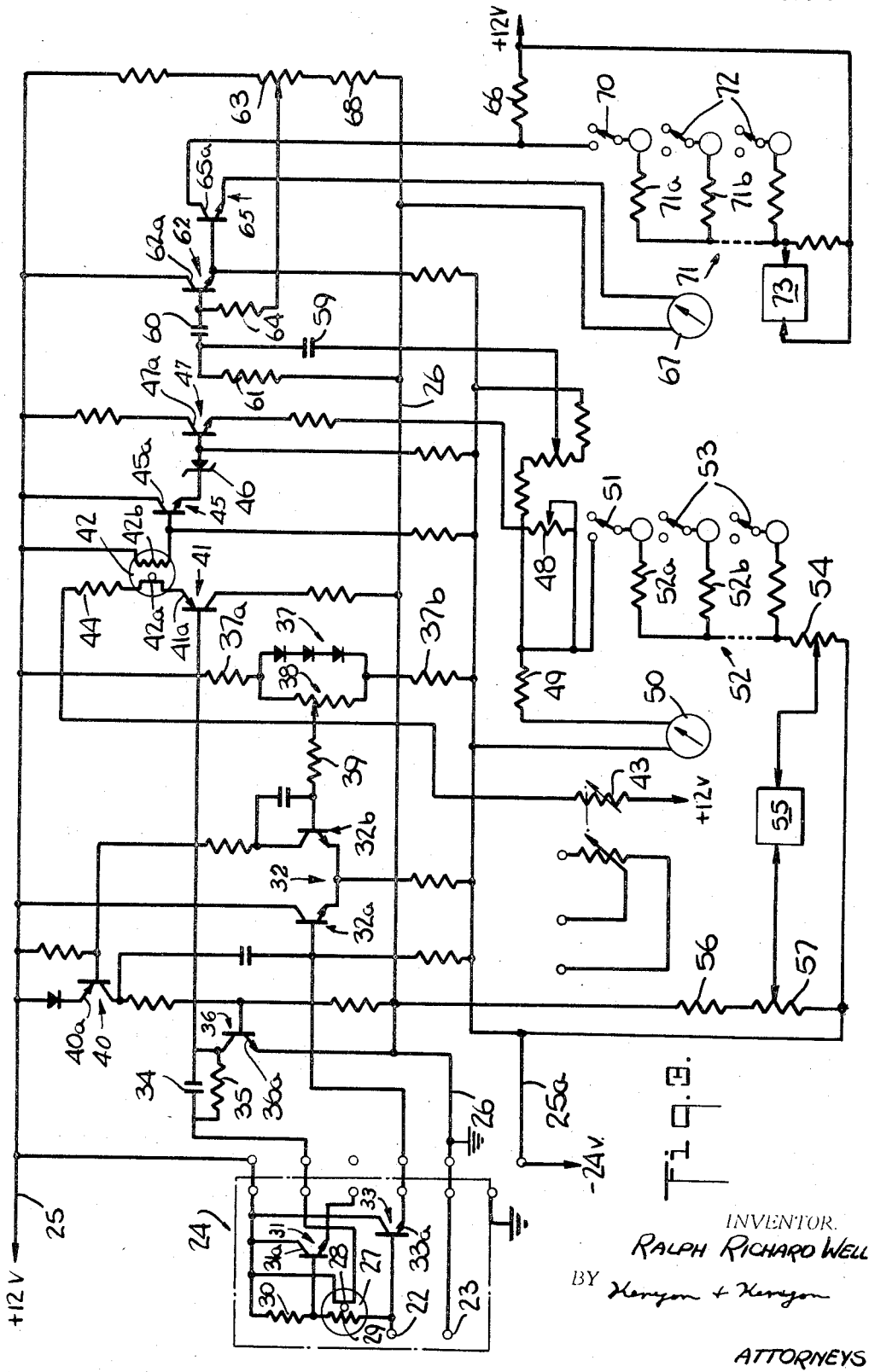

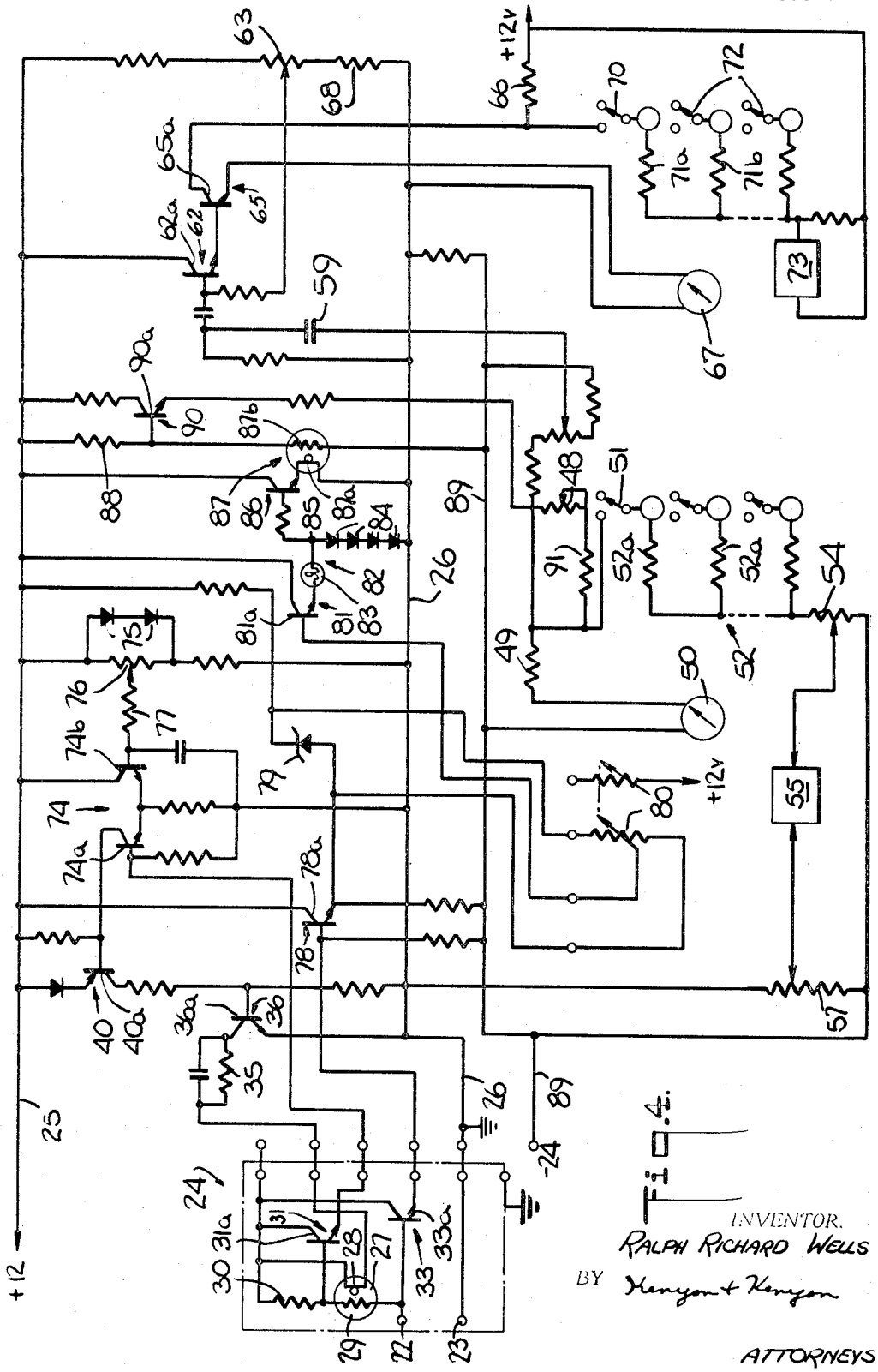

3,378,194
APPARATUS AND METHOD FOR MEASURING
THE RESPONSE OF AN AUDIENCE
Ralph R. Wells, Van Nuys, Calif., assignor, by mesne
assignments, to Screen Gems, Inc., New York, N.Y., a
corporation of Delaware
Filed June 11, 1965, Ser. No. 463,084
8 Claims. (Cl. 235—52)

The invention relates to apparatus and method for measuring the response of the members of an audience to an occurrence and more in particular to the measurement of the response of the psychogalvanic reflex of the members of the audience.

In the past attempts have been made to measure and indicate reactions of an audience in terms of the psychogalvanic reflex of the members of the audience. Such an approach has the advantage of being a totally passive system as far as the members of the audience are concerned so that there is no need for the members of the audience to operate rating devices, to mark cards, or to reply to questions, etc. concerning the occurrence which they are observing. Furthermore, such a passive system eliminates the possibility of confused or deliberately distorted ratings being supplied by the members of the audience. Equally important is the fact that since a subconscious body reflex is being indicated and measured, it enables a true representation of the reactions of the audience to be obtained. Thus any attempt by the members of the audience to hide or misrepresent their reactions or feelings is to a great extent counteracted.

In prior attempts to employ the psychogalvanic reflex in measuring the response of an audience, a low voltage electrical current is passed through the electrodes connected to the members of the audience and the changes in the current in response to changes in skin conductivity between the electrodes is amplified and recorded. In order to record the response of a portion of the audience as opposed to that of individual members, the electrodes have been serially connected to the recording instrument. Such a series arrangement is necessarily limited to a comparatively few members of the audience because of the comparatively high level of the accumulated skin resistance of the members to be measured. Thus, for example, such systems have been limited to measuring only ten to fifteen individuals.

However, the most signficant difficulty encountered in the prior art is that resulting from the fact that the resistance of individuals can vary over a great range with the result that any abnormally high or low resistance values can upset and make worthless any attempt to obtain a composite reading of a group of members of the audience. The difficulty occurs whether the members of the audience are connected to the indicating and recording equipment in series or in parallel. This is so since it is possible for the resistance of individual members to vary between extremes such as 10,000 ohms to 1,000,000 ohms. Thus, for example, it can be seen that a response in the range of 10,000 ohms would totally dominate a parallel composite reading in which the majority of the resistance of the members is of values which are many times higher than 10,000 ohms.

Another difficulty in systems in which the electrodes are serially connected to the recording instrument is that the procedure is interfered with whenever it is desired to remove one or more individuals from the group to be recorded. Obviously the removal of the electrodes connected to an individual from a series circuit would result in the circuit being opened and no output made available. As a result it has been found to be necessary to insert fixed resistances in place of any electrodes disconnected from the series circuit. This procedure can interfere with the proper indication of the response of the group of the audience since a fixed resistance is introduced in place of the varying value which would be contributed by the electrodes which have been removed.

It is one of the objects of the invention to indicate the psychogalvanic reflex of members of an audience in a manner which is unaffected by the range of resistance encountered.

It is another object of the invention to indicate the psychogalvanic reflex of groups of members of the audience in a manner which is unaffected by extremes of resistance.

It is still another object of the invention to provide an indication of the psychogalvanic reflex of a group of members of an audience in the form of a combined reading representing the overall response of the group in a manner which safeguards against misleading indications resulting from the variation in the nominal skin resistance of the members of the group of the audience.

It is an additional object of the invention to indicate the response of the psychogalvanic reflex of the members of an audience by converting the response into an output signal in accordance with a predetermined function.

It is a further object of the invention to indicate the response of the psychogalvanic reflex of the members of an audience by converting the signal resulting from each of the members of the audience into an output signal in accordance with a predetermned function and to combine the output signals to give a composite indicating signal.

It is still a further object of the invention to indicate and record the response of the psychogalvanic reflex of groups of the audience and predetermined subgroups of the audience simultaneously.

In one embodiment of the invention the system for indicating the psychogalvanic reflex of the members of an audience includes a plurality of contact members, each of which is adapted to be connected to a different member of the audience. The system further includes means connected to each of the contact members for converting the input signal thereof resulting from the psychogalvanic reflex into an output signal in accordance with a predetermined function. The system also includes means for indicating the output signal for each of the members of the audience. With this arrangement the converting of the input signal to each of the contact members into an output signal with a predetermined function results in the output signals being suitable for comparison to one another and in a condition adapted for subsequent combining in order to obtain a composite reading.

In another embodiment of the invention the system includes means for combining the output signals from the converting means into a composite signal representing a group of the audience.

In still another embodiment of the invention means are provided for maintaining a predetermined electrical condition at the contact members in order to distinguish the psychogalvanic reflex from long term electrical changes in the system.

In an additional embodiment of the invention the output of the contact members is converted to a logarithmic function.

Other objects and features of the present invention will become apparent upon consideration of the following detailed description when taken in conjunction with the accompanying drawings in which:

FIG. 1 is a general block diagram of the system of the invention;

FIG. 2 is a detailed block diagram of an embodiment of the invention in which a constant voltage is maintained at the contact member connected to the subject;

FIG. 3 is a schematic representation of an embodiment of the invention in which a constant voltage is maintained at the contact member connected to the subject whose response is to be indicated;

FIG. 4 is a schematic representation of an embodiment of the invention in which a constant current is maintained at the contact member connected to the subject whose response is to be indicated; and FIG. 5 is a schematic representation of a device for testing the amplifier of either of the circuits of FIGS. 3 or 4 to which the contact member connected to the subject under study is attached.

FIG. 1 shows a general block diagram which represents the apparatus and the method of the invention. The psychogalvanic reflex of the subject 10 can be derived by a contact member in circuit with the subject, such as a contact member contiguous with the skin surface of the subject. An electrical reference condition can be maintained at the contact member in circuit with the subject and by way of example, the electrical condition can be a constant voltage. Local voltage control 11 and linear amplifier 12 operate as a nulling-servo with feedback in order to maintain the constant voltage condition at the contact member. In such a servo, the output signal of linear amplifier 12 which is the signal necessary for nulling reflects the psychogalvanic reflex which must be nulled in order to maintain the constant voltage condition.

The output of linear amplifier 12 is conditioned to correspond to a predetermined non-linear function, such as a logarithmic function, by function generator 13a. The output of the function generator is connected to amplifier 13b. In effect, the output of the amplifier reflects the basal skin response of the subject which is the response of the psychogalvanic reflex expressed in terms of resistance change. It should be understood that the basal skin resistance is primarily that which is due to the psychogalvanic reflex and only secondarily related to resistance changes caused by the secretion of perspiration at the contact member. It is theorized that the psychogalvanic reflex is associated with activation of the sweat glands, but that the basal skin resistance phenomenon is not primarily a change in skin resistance due to the perspiration acting as an electrolytic conductor. Thus perspiration is usually considered a side effect and even though the skin contacts are properly designed, the side effect remains. In order to view the basal skin resistance of a particular member of the audience or subject, the output of logarithmic amplifier 13 can be applied to basal skin resistance (BSR) meter 14.

Where it is desired to indicate the response of a plurality of members of the audience to an occurrence, the output of amplifier 13b, associated with each subject 10, is combined by group mixing device 15 and presented by way of group recorder 16 connected thereto.

Experiments have shown that it is of advantage to present the changes of basal skin resistance in terms of its rate of change and such a presentation is defined as the galvanic skin response. For this purpose the output of amplifier 13b is connected by capacitive coupling 17 to linearity correcting or non-linear amplifier 18. Amplifier 18 serves to compensate for the non-linear function of the output of amplifier 13b and to derive the rate of change of the logarithmic function.

The output from amplifier 18 which corresponds to the galvanic skin response can be connected to individual galvanic skin response (GSR) meter 19 in order to indicate the response of each of the subjects. Again where it is desired to observe the response of a group of subjects, the output of amplifier 18 of each subject is combined by group mixing device 20 and presented by group GSR recorder 21.

Thus as shown in FIG. 1 where a plurality of subjects are to be studied, the system down to the individual BSR meter 14 and individual GSR meter 19 would be provided for each subject. Beyond that point, the plurality of circuits terminating with the meters, are combined by common group mixing devices for each of the BSR and GSR recorders. For the study of groups, the individual BSR and GSR meters are not needed and therefore can be eliminated.

Here it should be understood that converting the input signal at the contact members to a predetermined non-linear function such as a logarithmic function enables the converted signal to be combined even though the absolute levels of the input signals individually extend over a great range such as from ten thousand ohms to one million ohms. Thus by the conversion method of the invention a given percent change at one resistance level can be combined with a given resistance level at a greatly different resistance and yet the combined or composite output signal will reflect only the given percent change.

FIG. 2 is a detailed block diagram which represents the apparatus and the method of the invention in an arrangement by which a constant voltage is maintained across the contact member in circuit with the subject. FIG. 3 is a schematic representation of the block diagram of FIG. 2. The voltage values shown therein are merely by way of example. Subject 10 can be furnished with contact members, for example, which are connected to a pair of fingers. The contact members are connected to the fingers on the side opposite to the fingernail since the nail is a poor conductor. The contact members are connected to different ones of terminals 22 and 23. In order to prevent interference with the signal at the contact members from being effected by circuitry necessary to connect the individual members of the audience to the remainder of the system of the invention, the signal applied to terminals 22 and 23 can be amplified by amplifier 24 which is of a small size. For example, amplifier 24 can be placed in a container similar to that of a watch case and conveniently attached to the subject.

In the constant voltage arrangement of FIG. 3, the contact members connected to terminals 22 and 23 are connected in circuit across line 25 coupled to a voltage source and ground line 26. In order to maintain the constant voltage in the face of changes in basal skin resistance, it is necessary to employ a control element such as a vacuum tube, a transistor, a transistor of the field-effect type, or in the embodiment of FIG. 3, a photoelectric control element 27, one type of which is known by the trademark Raysistor and manufactured by the Raytheon Company. The control element 27 employs lamp 28 which varies the impedance of element 29. Thus the resistance in series with terminals 22 and 23 is that of element 29 and resistor 30 connected thereto. Both lamp 28 and element 29 have known non-linear characteristics.

Fixed resistance 30 is connected by emitter-follower 31 including transistor 31a which is not employed in the circuit of FIG. 3. The output of resistor 30 and variable resistance or element 29 are coupled by emitter-follower 33 including transistor 33a to transistor 32a of differential amplifier 32. Diodes 37 are connected by resistors 37a and 37b across lines 25 and 25a and in turn are connected in circuit with potentiometer 38. The potentiometer enables a predetermined reference voltage resulting from the constant drop across the diodes to be applied through resistor 39 to transistor 32b of differential amplifier 32. The potentiometer can sweep a range of voltage from a voltage slightly below the zero or common line 26 to a voltage above that line. Thus the differential amplifier compares the voltage across fixed resistance 30 and variable resistance 29 with the reference voltage derived from diodes 37. The output from the differential amplifier is connected to PNP amplifier 40 which includes transistor 40a. The output from PNP amplifier 40 controls NPN amplifier 36 having transistor 36a. Lamp 28 of the Raysistor or control device 27 is connected to the load circuit of NPN transistor 36 and thereby the current applied to the lamp is controlled. Transistor 40a of the PNP amplifier serves to invert the output of the differential amplifier so that NPN amplifier in conjunction with the lamp can be controlled in the manner of a closed loop servo.

In the case of increasing basal skin resistance across terminals 22 and 23, the current through lamp 28 is decreased and, as a result, the resistance of variable resistance 29 is increased. This function, by varying the current, enables a constant voltage to be maintained across terminals 22 and 23. The reserve effect takes place upon a decrease in the basal skin resistance. Thus it can be seen that for either change the differential amplifier 32 and the PNP amplifier 40 and NPN amplifier 36 control the current to Raysistor 27 in the manner of a closed-loop servo to maintain a constant voltage condition at the input terminals.

The degenerative feedback provided by capacitor 34 safeguards the servo loop from oscillattion which could otherwise result from line coupling or crosstalk.

For certain investigations it may be desirable to establish a zero voltage across terminals 22 and 23. This can be accomplished by the setting of potentiometer 38 so that the voltages appearing between terminals 22 and 23 are cancelled out by a current flowing through resistors 29 and 30. In the presence of a zero voltage across the input terminals, a voltage phenomena related to the psychogalvanic reflex and known as the Tarchinoff potential, can be determined. This potential may also be measured by using zero current methods derived by methods similar to that used to obtain zero voltage.

The corrective current applied to lamp 27 is sensed by the drop across resistor 35 which is coupled by way of emitter-follower 41 including transistor 41a to variable resistance or Raysistor 42. Raysistor 42 is essentially in parallel with Raysistor 27. Potentiometer 43, which is connected by resistor 44 to lamp 42a of the Raysistor, serve as a linearity control for Raysistor 42. Due to the parallel relationship, the resistance change at resistance element 42b in Raysistor 42 follows that of element 29 in Raysistor 27. In addition Raysistor 42 tends to compensate for the non-linearity characteristic of the lamps in each of Raysistors 42 and 29.

Variable resistance element 42b of Raysistor 42 is coupled by emitter-follower 45, including transistor 45a, to Zener diode 46 which has a known non-linear characteristic. Thus Zener diode 46 becomes one of the nonlinear elements of the system which in conjunction with the known non-linear characteristic of Raysistors 27 and 42 and the control provided by potentiometers 43 and 48 converts the input at the contact member to a predetermined non-linear function. Therefore Zener diode 46 together with Raysistors 27 and 42 act as a logarithmic function generator. In turn, Zener diode 46 is connected to the emitter-follower 47 including transistor 47a. By means of potentiometer 43 connected by Raysistor 42 and potentiometer 48 connected to transistor 47a, the degree of compensation to the circuit can be controlled in order that its function may be made nonlinear to a predetermined extent. Thus, potentiometers 43 and 48 operate as linearity controls and can determine the output function of transistor 47a to be a non-linear function such as a logarithmic function.

The current from transistor 47a, which passes through potentiometer 48 and resistor 49 actuates meter 50 to provide an indication of basal skin resistance. Where it is desired to combine the response of each of the members of the audience group in order to obtain a composite reading, the output from potentiometer 48 is connected by switch 51 into mixing matrix 52 having resistor 52a, b, etc. Switches 53 are adapted to connect other circuits such as that shown in FIG. 3 leading from additional subjects into the mixing matrix. Since the output from potentiometer 48 corresponds to a non-linear function such as a logarithmic function of the change in resistance measure at the contact member, the non-linear or logarithmic response for a given change in resistance at the contact member represents the same output voltage change regardless of the nominal resistance of the subject sensed at the contact member so long as the nominal resistance remains within the limits for which a given apparatus of the system of the invention is designed such as, for example, the limits of 10,000 ohms to 1,000,000 ohms. As a result the non-linear or logarithmic response of the change of resistance at the contact member of each of a plurality of subjects can be combined by the mixing matrix since the response to a given percentage change of resistance of one subject having a nominal 10,000 ohm BSR will be the same as the response of another subject having a 1,000,000 ohm BSR and experiencing the same percentage change of resistance. The output of mixing matrix 52 is coupled by potentiometer 54 to basal skin resistance recorder 55. Potentiometer 54 enables the scale factor of the recorder to be determined. Resistor 56 in conjunction with potentiometer 57 provides variable offset voltage control 58 for recorder 55.

The output of potentiometer 54 which can reflect the response of a predetermined group of the audience can be represented with the output of other groups by use of the apparatus of my copending U.S. patent application, Ser. No. 436,046, filed Mar. 1, 1965, now Patent No. 3,318,517. In my copending application, the response of the audience is indicated by rating devices operated by the members of the audience. The rating devices provided both individually and in groups provide predetermined output levels and therefore can be directly indicated and recorded. When presenting the group or subgroup output of the mixing matrix of the apparatus of the invention, in the manner of my copending application it becomes necessary to adjust to provide a balancing factor and this is accomplished by means of variable offset control 57. Thus if the members of a given group had BSR values predominantly at the high end of a range extending to about 1 megohm, the output of the mixing matrix would have one reference level or base line. On the other hand, if the group had BSR values nearer to 10,0000 ohms, another reference level would exist. With the varying reference levels or base lines, the providing of comparative recordings or indications would be made difficult. Potentiometer 57 enables a group or subgroup whose output appears at potentiometer 54 to be balanced or set to a predetermined reference level. Since the output of each mixing matrix can be set to the same predetermined reference level, it then becomes possible to indicate or record the various groups or subgroup with respect to a single reference level.

Thus it can be seen that the DC component from emitter follower 47 is applied to either meter 50 or recorder 55 by way of matrix 52 in order to indicate the basal skin resistance. If instead it is desired to indicate the galvanic skin response, that is the rate of change of the basal skin resistance, the AC component from potentiometer 48 at the junction with resistor 49 is separated out by capacitors 59 and 60 which have a large time constant. In order to compensate for the leakage current through capacitors 59 and 60, ground leakage by-pass resistor 61 is provided, which couples the common connection of the capacitors to ground line 26.

Coupling capacitor 60 is connected to emitter-follower 62 including transistor 62a, which is biased by potentiometer 63 connected to the transistor by means of resistor 64. Transistor 62a is operated with a nearly starved input level so that the transistor has a non-linear response. This non-linear response compensates for the non-linear characteristic of the previous stage. In effect, transistor 62a, by virtue of its non-linear response which is in opposition to the non-linear characteristic of the previous stage, can serve to compensate the output of the previous stage. Thus any negatively going portions of the AC component at potentiometer 48 is severely attenuated while the positive going portions are non-linearly amplified. The positive going portions are those used in the apparatus of the invention.

Emitter-follower 62 is connected to meter drive circuit 65, which includes transistor 65a. As a result the signal across resistor 66 and that applied to meter 67 has a linearized output because of the compensating type of operation of transistor 62a. Consequently a practically linear response can be obtained for a range, for example, of approximately 10,000 ohms to 1,000,000 ohms. The value of resistor 68 is selected in response to the beta characteristic of transistor 65a.

In place of or in addition to the meter presentation of the galvanic skin response of a single member of the audience, the signal across resistor 66 can be coupled by means of switch 70 into mixing matrix 71, which includes resistors 71a, 71b, etc. The output of the circuits of additional subjects similar to that of FIG. 3 are connected to matrix 71 by means of switches 72. In turn the matrix is connected to galvanic skin response recorder 73.

FIG. 4 shows an embodiment of the invention in which a constant current is maintained across the contact member connected to terminals 22 and 23 rather than the constant voltage as in the embodiment of FIG. 3. In the constant current embodiment, the watch case amplifier 24 of the type described with respect to FIG. 3 can be employed.

Transistor 31a is connected as an emitter-follower or current amplifier to fixed resistance 30. In turn, the emitter-follower including transistor 31a is connected to transistor 74a of differential amplifier 74. Diodes 75 connected across lines 25 and 26 provide a reference voltage to transistor 74b of the differential amplifier by the connection through potentiometer 76 and resistor 77. The output from transistor 74a of the differential amplifier is applied to PNP amplifier 40 including transistor 40a. The output of the PNP amplifier in turn drives NPN amplifier 36 including transistor 36a through resistor 35. The controlled current is applied to lamp 28 of Raysistor 27 in order to control the impedance of the variable resistance element 29. In this way a constant current is controlled by the closed loop servo which includes the differential amplifier and the PNP and NPN amplifiers.

Emitter-follower or current amplifier 33 which includes transistor 33a is connected to emitter-follower or current amplifier 78 which includes transistor 78a. A shift in the DC level at the output of transistor 78a is obtained by Zener diode 79 which, by way of example, can have a voltage drop of 7.5 volts. The output of the Zener diode is connected through potentiometer 80 which is a linearity control to emitter-follower or current driver 81 including transistor 81a.

A logarithmic voltage divider 82 is provided by the impedance of lamp 83 and diodes 84. Lamp 83 tends to maintain a constant current while diodes 84 tend to maintain a constant voltage drop. Terminal 85 of the logarithmic voltage divider is connected to emitter-follower 86 including transistor 86a which serves as a driver for lamp 87a of Raysistor 87.

Variable resistance 87b of Raysistor 87 which is controlled by lamp 87a is connected in circuit with resistor 88 across lines 25 and 89. Thus variable resistance 87b in conjunction with resistor 88 form a voltage divider. With this arrangement, the constant current characteristic of lamp 83, the constant voltage characteristic of diodes 84 and the non-linear characteristics of lamp 87a and resistance 87b of Raysistor 87 form a non-linear function generator which converts the change at the contact member connected through current amplifier 78 and Zener diode 79, into a non-linear response. The response is coupled to transistor 90a. Transistor 90a of driver circuit 90 is connected through potentiometer 48, resistor 91, and resistor 49 to meter 50 which gives an indication of the basal skin resistance of the subject.

From this point on the embodiment of the constant current circuit of FIG. 4 is substantially the same as the corresponding portions of the constant voltage circuit of the embodiment of FIG. 3. Thus matrix 52 can be provided in order to record the combined readings from a plurality of subjects by means of recorder 55. In addition the portion of the circuitry enclosed in the dash line at the right hand portion of FIG. 2 and extending from coupling condenser 59 can be employed in the constant current embodiment of FIG. 4 in order to obtain a galvanic skin response of an individual subject from the combined galvanic skin response of a group of subjects.

In FIG. 5 there is shown an arrangement for testing the operation of watch case amplifier 24. The testing device includes source 92 of predetermined test voltages. One side of the source is connected at terminal 93 to terminal 23 of the watch case amplifier. Resistors 94 are selected to have a range of values such as those corresponding to the range of basal skin resistance. By way of example, resistors 94 may extend in value from 10,000 ohms to 1,000,000 ohms. By means of selector switch 94 having arm 95a connected to terminal 22 of amplifier 24, any one of resistors 94 can be applied to amplifier 24. The operation of the amplifier can be indicated by the connection of test leads to terminals 96.

As previously discussed the embodiments of the invention shown in FIGS. 3 and 4 can be employed to indicate the basal skin resistance and the galvanic skin response of an individual member of the audience by meter presentations. In addition, as previously discussed, the basal skin resistance and galvanic skin response of a group of members of the audience can be combined by matrices and indicated by recorders. In addition to these techniques the output from the circuits shown in FIGS. 3 and 4 of each member of the audience can also be subjected to data processing apparatus such as shown in my copending U.S. patent application, Ser. No. 436,046, filed Mar. 1, 1965, now Patent No. 3,318,517. In my co-pending application the response of the audience is indicated by rating devices operated by the members of the audience. Instead of the output of the rating device, the output of the circuits shown in FIGS. 3 and 4 for each member of the audience being studied can be applied to the measuring system of my co-pending application.

While the contacts to be applied to the subject have been recited as being those applied to the inner portion of a pair of fingers, other contacts known in the art pertaining to sensing the psychogalvanic reflex can be employed. Portions of the body other than the fingers can be used. Flexible contacts in place of rigid ones are suitable. Contacts which are operative through the surface of the skin of the subject can be used. It is also possible to use electrically conductive liquids to serve as contacts.

The above described arrangements are illustrative of the principles of the invention. Other embodiments may be devised by those skilled in the art without departing from the spirit and scope of the invention.

What is claimed:

1. A system for indicating the response of the psychogalvanic reflex of members of an audience to an occurrence, the nominal value of the resistance of each of the members of the audience being in a range of nominal values extending over a plurality of decades, comprising a plurality of contact members each being adapted to be connected to a different member of the audience, means connected to each of said contact members and being operative with members of the audience connected thereto whose nominal values of resistance extend over a range of a plurality of decades for converting the signal of each of said contact members resulting from the psychogalvanic reflex into an output signal which is a non-linear function of the input signal, the output signal as a result of the non-linear function having a substantially uniform change for a given response in proportion to the nominal value of the resistance of the member of the audience throughout the range of nominal values of the resistance of the member extending over a plurality of decades whereby the output signal can be employed to indicate the response of each member of the audience.

2. A system in accordance with claim 1 in which said means connected to each of said contact members for converting the input signal thereof resulting from the psychogalvanic reflex into an output signal which is a non-linear function of the input signal comprises a non-linear device connected in circuit with the input signal, and an amplifier connected to said non-linear device, whereby the output signal of the amplifier is a non-linear function of the input signal.

3. A system in accordance with claim 1 in which said means connected to each of said contact members for converting the input signal thereof resulting from the psychogalvanic reflex into an output signal which is a non-linear function of the input signal comprises a device having a predetermined electrical condition thereacross connected in circuit with the input signal, and an amplifier connected to said device, whereby the output signal of the amplifier is a non-linear function of the input signal.

4. A system for indicating the response of a psychogalvanic reflex of members of an audience to an occurrence, the nominal value of the resistance of each of the members of the audience being in a range of nominal values extending over a plurality of decades, comprising a plurality of contact members each being adapted to be connected to a different member of the audience, means connected to each of said contact members for maintaining a predetermined constant electrical condition at each of said contact members in response to any change in the electrical condition at said contact members from the predetermined constant electrical condition, and means connected to said maintaining means and being operative with members of the audience connected thereto whose nominal values of resistance extend over a range of a plurality of decades for providing an output signal which is a predetermined function of the response of said maintaining means when the predetermined constant electrical condition is being maintained thereby, the output signal as a result of the non-linear function having a substantially uniform change for a given response in proportion to the nominal value of the resistance of the member of the audience throughout the range of nominal values of the resistance of the member extending over a plurality of decades, whereby the output signal indicates the psychogalvanic reflex of the members of the audience.

5. A system for indicating the response of the psychogalvanic reflex of members of an audience to an occurrence, the nominal value of the resistance of each of the members of the audience being in a range of nominal values extending over a plurality of decades, comprising a plurality of contact members each being adapted to be connected to a different member of the audience, means connected to each of said contact members for amplifying the input signal thereof resulting from the psychogalvanic reflex, and a non-linear electrical device for conditioning the amplified signal from said amplifying means, said non-linear device being operative with members of the audience connected thereto whose nominal values of resistance extend over a range of a plurality of decades, the output signal as a result of the non-linear function having a substantially uniform change for a given response in proportion to the nominal value of the resistance of the member of the audience throughout the range of nominal values of the resistance of the member extending over a plurality of decades, whereby the output of the system is a predetermined function of the input signal at said contact members.

6. A system for indicating the response of the psychogalvanic reflex of members of an audience to an occurrence in terms of galvanic skin response, the nominal value of the resistance of each of the members of the audience being in a range of nominal values extending over a plurality of decades, comprising a plurality of contact members each being adapted to be connected to a different member of the audience, means connected to each of said contact members and being operative with members of the audience connected thereto whose nominal values of resistance extend over a range of a plurality of decades for converting the input signal of each of said contact members resulting from the psychogalvanic reflex into an intermediate signal which is a non-linear function of the input signal, the output signal as a result of the non-linear function having a substantially uniform change for a given response in proportion to the nominal value of the resistance of the member of the audience throughout the range of nominal values of the resistance of the member extending over a plurality of decades, and means for deriving an output signal which corresponds to the rate of change of the intermediate signal, whereby the output signal represents the galvanic skin response.

7. A system for indicating the response of the psychogalvanic reflex of members of an audience to an occurrence, the nominal value of the resistance of each of the members of the audience being in a range of nominal values extending over a plurality of decades, comprising a plurality of contact members each being adapted to be connected to a different member of the audience, means connected to each of said contact members and being operative with members of the audience connected thereto whose nominal values of resistance extend over a range of a plurality of decades for converting the input signal of each of said contact members resulting from the psychogalvanic reflex into an output signal which is a non-linear function of the input signal, the output signal as a result of the non-linear function having a substantially uniform change for a given response in proportion to the nominal value of the resistance of the member of the audience throughout the range of nominal values of the resistance of the member extending over a plurality of decades, and means for combining the output signal related to each of the members of the audience into a composite output signal, whereby the overall response of the members of the audience can be indicated.

8. A system for indicating the response of a psychogalvanic reflex of the members of an audience to an occurrence, the nominal value of the resistance of each of the members of the audience being in a range of nominal values extending over a plurality of decades, comprising a plurality of contact members each being adapted to be connected to a different member of the audience, means connected to each of said contact members for maintaining a substantially zero electrical condition at each of said contact members in response to a change in the electrical condition at said contact members, and means connected to said maintaining means for providing an output signal when the predetermined zero electrical condition is being maintained thereby, whereby the output signal indicates the psychogalvanic reflex of the members of the audience.

References Cited

UNITED STATES PATENTS

| | | | |
|---|---|---|---|
| 1,761,476 | 6/1930 | Hathaway | 128—2.1 |
| 2,308,933 | 1/1943 | Raesler | 128—2.1 |
| 2,339,579 | 1/1944 | Milne et al. | 128—2.1 |
| 2,661,734 | 12/1953 | Holzer et al. | 128—2.1 |
| 2,712,976 | 7/1955 | Blaustein et al. | 235—52 X |
| 2,829,638 | 4/1958 | Douglas | 128—2.1 |
| 2,878,996 | 3/1959 | Millard | 235—52 |
| 3,034,500 | 5/1962 | Backster. | |
| 3,085,566 | 4/1963 | Tolles | 128—2.1 |
| 3,093,795 | 6/1963 | Jones | 235—52 X |

RICHARD B. WILKINSON, *Primary Examiner.*

LOUIS J. CAPOZI, *Examiner.*

STANLEY A. WAL, J. G. MURRAY,
  *Assistant Examiners.*